(12) United States Patent
Shibasaki et al.

(10) Patent No.: US 12,448,472 B2
(45) Date of Patent: Oct. 21, 2025

(54) METHOD FOR PRODUCING FLUORINE-CONTAINING POLYMER, AQUEOUS DISPERSION LIQUID, AND FLUORINE-CONTAINING POLYMER COMPOSITION

(71) Applicant: AGC Inc., Tokyo (JP)

(72) Inventors: Kosuke Shibasaki, Tokyo (JP); Yukiko Hattori, Tokyo (JP); Shinya Higuchi, Tokyo (JP); Junko Anzai, Tokyo (JP)

(73) Assignee: AGC Inc., Tokyo (JP)

( * ) Notice: Subject to any disclaimer, the term of this patent is extended or adjusted under 35 U.S.C. 154(b) by 835 days.

(21) Appl. No.: 17/470,469

(22) Filed: Sep. 9, 2021

(65) Prior Publication Data

US 2021/0403623 A1    Dec. 30, 2021

Related U.S. Application Data

(63) Continuation of application No. PCT/JP2020/013770, filed on Mar. 26, 2020.

(30) Foreign Application Priority Data

Mar. 27, 2019 (JP) ................................. 2019-060003

(51) Int. Cl.
*C08F 214/26* (2006.01)
*C08F 265/04* (2006.01)

(52) U.S. Cl.
CPC ...... *C08F 214/267* (2013.01); *C08F 214/265* (2013.01); *C08F 265/04* (2013.01); *C08F 2800/10* (2013.01)

(58) Field of Classification Search
CPC .............. C08F 214/267; C08F 214/265; C08F 2800/10; C08F 2/44; C08L 51/003
See application file for complete search history.

(56) References Cited

U.S. PATENT DOCUMENTS

| | | | |
|---|---|---|---|
| 5,646,201 A | 7/1997 | Araki et al. | |
| 2009/0221776 A1 | 9/2009 | Durali et al. | |
| 2018/0030182 A1* | 2/2018 | Jochum | C08F 214/222 |
| 2019/0144700 A1* | 5/2019 | Hosoda | H05B 3/285 216/13 |
| 2020/0010694 A1 | 1/2020 | Kakiuchi et al. | |
| 2020/0115509 A1* | 4/2020 | Hosoda | H05K 3/0014 |

FOREIGN PATENT DOCUMENTS

| | | | |
|---|---|---|---|
| JP | 2000-44928 A | 2/2000 | |
| JP | 2009-504841 A | 2/2009 | |
| WO | WO 95/08582 A1 | 3/1995 | |
| WO | WO 95/34583 A1 | 12/1995 | |
| WO | WO 2007/046377 A1 | 4/2007 | |
| WO | WO-2016017801 A1 * | 2/2016 | B32B 15/08 |
| WO | WO-2018016644 A1 * | 1/2018 | B29C 41/24 |
| WO | WO 2018/181740 A1 | 10/2018 | |
| WO | WO 2019/065640 A1 | 4/2019 | |
| WO | WO 2019/065644 A1 | 4/2019 | |
| WO | WO-2019065638 A1 * | 4/2019 | C08F 14/26 |

OTHER PUBLICATIONS

International Search Report issued Jun. 16, 2020 in PCT/JP2020/013770, filed on Mar. 26, 2020, 3 pages.

Combined Russian Office Action and Search Report issued Jun. 29, 2023, in corresponding Russian Patent Application No. 2021131171/04(066114) (English Translation only) 12 pages.

Kostitsyn, A.V. et al., Influence of the concentration of the netshape forming component on the properties of polymer mixtures based on polyvinylidene fluoride. News of higher educational institutions. Series: Chemistry and Chemical Technology. 2009, vol. 52, No. 8, 82-84 p. (table).

\* cited by examiner

*Primary Examiner* — Katarzyna I Kolb
(74) *Attorney, Agent, or Firm* — Oblon, McClelland, Maier &Neustadt, L.L.P.

(57) ABSTRACT

A method for producing a fluorinated polymer which does not require an emulsifier as an essential component while an aqueous medium with little environmental burden is used. A method for producing a fluorinated polymer, which includes polymerizing a fluorinated monomer selected from tetrafluoroethylene, chlorotrifluoroethylene and vinylidene fluoride, in an aqueous medium in the presence of a first polymer having units based on a compound represented by formula (1): $CXY=CR^1-L-R^2$.

9 Claims, No Drawings

METHOD FOR PRODUCING FLUORINE-CONTAINING POLYMER, AQUEOUS DISPERSION LIQUID, AND FLUORINE-CONTAINING POLYMER COMPOSITION

TECHNICAL FIELD

The present invention relates to a method for producing a fluorinated polymer, an aqueous dispersion, and a fluorinated polymer composition.

BACKGROUND ART

Heretofore, fluorinated polymers such as an ethylene/tetrafluoroethylene copolymer and a tetrafluoroethylene/perfluoroalkyl vinyl ether copolymer, which are excellent in heat resistance, chemical resistance, flame retardancy, weather resistance, etc., are widely used in various industrial fields.

As a method for producing a fluorinated polymer, a method of emulsion-polymerizing a fluorinated monomer in an aqueous medium using a fluorinated emulsifier may be mentioned (Patent Document 1).

PRIOR ART DOCUMENTS

Patent Document

Patent Document 1: WO2007/046377

DISCLOSURE OF INVENTION

Technical Problem

Since the method in Patent Document 1 employs an aqueous medium, it imposes less environmental burden, however, if the emulsifier as an essential component remains in a large amount in an aqueous dispersion obtained by polymerization, removal of the emulsifier is necessary depending upon the application.

The present invention provides a method for producing a fluorinated polymer which does not require an emulsifier as an essential component even though an aqueous medium with little environmental burden is used.

Solution to Problem

The present inventors have conducted extensive studies and as a result, found that the above object can be achieved by the following constitution.

[1] A method for producing a fluorinated polymer, which comprises polymerizing at least one fluorinated monomer selected from tetrafluoroethylene, chlorotrifluoroethylene and vinylidene fluoride, in an aqueous medium in the presence of a first polymer having units based on a compound represented by the following formula (1):

$$CXY=CR^1\text{-}L\text{-}R^2 \qquad (1)$$

wherein X and Y are each independently a hydrogen atom, a halogen atom or a methyl group, $R^1$ is a hydrogen atom, a halogen atom or a $C_{1-3}$ alkyl group, L is —CO—O—*, —O—CO—* or —O—, provided that * represents the binding position to $R^2$, and $R^2$ is a cyclic alkyl group, a monovalent aromatic hydrocarbon group or a $C_{1-6}$ linear alkyl group, provided that the $C_{1-6}$ linear alkyl group as $R^2$ may have an etheric oxygen atom in a carbon-carbon bond, and the hydrogen atom in the cyclic alkyl group, the monovalent aromatic hydrocarbon group or the $C_{1-6}$ linear alkyl group as $R^2$ may be replaced with a halogen atom.

[2] The production method according to [1], wherein the amount of the first polymer present is from 0.0001 to 1.0 parts by mass per 100 parts by mass of the aqueous medium.

[3] The production method according to [1] or [2], wherein the first polymer present in the aqueous medium comprises particles having a volume based cumulative 50% particle size of from 10 to 1,000 nm.

[4] The production method according to any one of [1] to [3], wherein the first polymer is a polymer obtained by polymerizing a compound represented by the above formula (1) using a water-soluble polymerization initiator in an amount of from 0.1 to 5.0 mol per mol of the compound represented by the formula (1).

[5] A method for producing a fluorinated polymer, which comprises polymerizing a compound represented by the following formula (1) in an aqueous medium to obtain an aqueous medium in which a first polymer is present, and then polymerizing at least one fluorinated monomer selected from tetrafluoroethylene, chlorotrifluoroethylene and vinylidene fluoride in the aqueous medium in which the first polymer is present to produce a fluorinated polymer:

$$CXY=CR^1\text{-}L\text{-}R^2 \qquad (1)$$

wherein X and Y are each independently a hydrogen atom, a halogen atom or a methyl group, $R^1$ is a hydrogen atom, a halogen atom or a $C_{1-3}$ alkyl group, L is —CO—O—*, —O—CO—* or —O—, provided that * represents the binding position to $R^2$, and $R^2$ is a cyclic alkyl group, a monovalent aromatic hydrocarbon group or a $C_{1-6}$ linear alkyl group, provided that the $C_{1-6}$ linear alkyl group as $R^2$ may have an etheric oxygen atom in a carbon-carbon bond, and the hydrogen atom in the cyclic alkyl group, the monovalent aromatic hydrocarbon group or the $C_{1-6}$ linear alkyl group as $R^2$ may be replaced with a halogen atom.

[6] The production method according to [5], wherein the aqueous medium in which the first polymer is present, is an aqueous medium which is used for producing the first polymer and in which the first polymer is thus present.

[7] The production method according to [5] or [6], wherein the compound represented by the above formula (1) is polymerized by using a water-soluble polymerization initiator in an amount of from 0.1 to 5.0 mol per mol of the compound represented by the formula (1).

[8] The production method according to any one of [5] to [7], wherein the amount of the first polymer present at the time of polymerizing the fluorinated monomer is from 0.0001 to 1.0 parts by mass per 100 parts by mass of the aqueous medium.

[9] A fluorinated polymer aqueous dispersion comprising an aqueous medium, particles containing a fluorinated polymer having units based on at least one fluorinated monomer selected from tetrafluoroethylene, chlorotrifluoroethylene and vinylidene fluoride and having a volume based cumulative 50% particle size of from 20 to 3,000 nm, and a first polymer having units based on a compound represented by the following formula (1), contained as particles in the aqueous medium or contained in particles containing the fluorinated polymer:

$$CXY=CR^1\text{-}L\text{-}R^2 \qquad (1)$$

wherein X and Y are each independently a hydrogen atom, a halogen atom or a methyl group, $R^1$ is a hydrogen atom, a halogen atom or a $C_{1-3}$ alkyl group, L is —CO—O—*, —O—CO—* or —O—, provided that * represents the binding position to $R^2$, and $R^2$ is a cyclic alkyl group, a monovalent aromatic hydrocarbon group or a $C_{1-6}$ linear alkyl group, provided that the $C_{1-6}$ linear alkyl group as $R^2$ may have an etheric oxygen atom in a carbon-carbon bond, and the hydrogen atom in the cyclic alkyl group, the monovalent aromatic hydrocarbon group or the $C_{1-6}$ linear alkyl group as $R^2$ may be replaced with a halogen atom.

[10] The fluorinated polymer aqueous dispersion according to [9], which contains the particles containing the fluorinated polymer in an amount of from 1.0 to 50.0 parts by mass per 100 parts by mass of the aqueous medium.

[11] The fluorinated polymer aqueous dispersion according to [9] or [10], which contains the particles of the first polymer in an amount of from 0.0001 to 1.0 parts by mass per 100 parts by mass of the aqueous medium.

[12] The fluorinated polymer aqueous dispersion according to any one of [9] to [11], which contains the particles of the first polymer in an amount of from 0.001 to 5.00 parts by mass per 100 parts by mass of the particles containing the fluorinated polymer.

[13] The fluorinated polymer aqueous dispersion according to any one of [9] to [12], wherein the particles of the first polymer are particles having a volume based cumulative 50% particle size of from 10 to 1,000 nm.

[14] A polymer composition, which comprises a first polymer having units based on a compound represented by the following formula (1), and a fluorinated polymer having units based on at least one fluorinated monomer selected from tetrafluoroethylene, chlorotrifluoroethylene and vinylidene fluoride, and which has a peak derived from units based on the compound represented by the following formula (1) at from 1,500 to 1,800 cm$^{-1}$ in an infrared absorption spectrum:

$$CXY=CR^1\text{-}L\text{-}R^2 \qquad (1)$$

wherein X and Y are each independently a hydrogen atom, a halogen atom or a methyl group, $R^1$ is a hydrogen atom, a halogen atom or a $C_{1-3}$ alkyl group, L is —CO—O—*, —O—CO—* or —O—, provided that * represents the binding position to $R^2$, and $R^2$ is a cyclic alkyl group, a monovalent aromatic hydrocarbon group or a $C_{1-6}$ linear alkyl group, provided that the $C_{1-6}$ linear alkyl group as $R^2$ may have an etheric oxygen atom in a carbon-carbon bond, and the hydrogen atom in the cyclic alkyl group, the monovalent aromatic hydrocarbon group or the $C_{1-6}$ linear alkyl group as $R^2$ may be replaced with a halogen atom.

[15] The polymer composition according to [14], wherein the content of the first polymer is from 0.001 to 5.00 parts by mass per 100 parts by mass of the fluorinated polymer.

Advantageous Effects of Invention

According to the present invention, it is possible to provide a method for producing a fluorinated polymer which does not require an emulsifier as an essential component even though an aqueous medium with little environmental burden is used.

DESCRIPTION OF EMBODIMENTS

Meanings of terms in this specification are as follows.

A "unit" generally means an atomic group directly formed by polymerization of a monomer, derived from one molecule of the monomer. The content (mass %) of each type of units to all the units in a polymer is obtained by analyzing the polymer by solid nuclear magnetic resonance (NMR) method, or may be estimated from the amount of the units charged. Usually, the content of each type of units calculated from the amount of the units charged substantially agrees with the actual content of the units.

A "volume based cumulative 50% particle size" means a particle size at a point where the cumulative volume is 50% on a cumulative curve obtained by measuring the particle size distribution by laser diffraction/scattering method and taking the total volume of the group of the particles being 100%. Hereinafter sometimes referred to as "D50".

A "peak in an infrared absorption spectrum" is measured with respect to a film having a thickness of 100 μm obtained by pressing a composition containing a fluorinated polymer by an infrared spectrophotometer (manufactured by ThemoFisher SCIENTIFIC).

The method for producing a fluorinated polymer of the present invention is a method which comprises polymerizing at least one fluorinated monomer selected from tetrafluoroethylene, chlorotrifluoroethylene and vinylidene fluoride (hereinafter sometimes referred to as "specific fluorinated monomer"), in an aqueous medium in the presence of a first polymer (hereinafter sometimes referred to as "specific polymer") having units based on a compound represented by the following formula (1) (hereinafter sometimes referred to as "compound (1)").

In the method for producing a fluorinated polymer of the present invention, a specific polymer obtained by separate polymerization may be used, or a specific polymer is obtained by polymerization in an aqueous medium, and sequentially in the same polymerization system, a specific fluorinated monomer may be polymerized. Polymerization sequentially in the same polymerization system means that an aqueous medium which is used for producing the specific polymer and in which the specific polymer is thus present, is used, and the specific fluorinated monomer is polymerized in the aqueous medium in which the specific polymer is present. As the specific polymer obtained by separate polymerization, commercial products may be used.

The method for producing a fluorinated polymer of the present invention is preferably a method of polymerizing the compound (1) in an aqueous medium to obtain an aqueous medium in which the specific polymer is present, and polymerizing the specific fluorinated monomer in the aqueous medium in which the specific polymer is present to produce a fluorinated polymer. In such a two-step production method, the first step of obtaining the aqueous medium in which the specific polymer is present will be hereinafter referred to as "step 1", and the latter step of producing the fluorinated polymer will be hereinafter referred to as "step 2".

Polymerization of the compound (1) in step 1 and polymerization of the specific fluorinated monomer in step 2 are each preferably conducted in the presence of a polymerization initiator. The polymerization initiator is preferably a water-soluble polymerization initiator.

<Step 1>

In step 1, as the compound (1), two or more types may be used in combination.

$$CXY=CR^1\text{-}L\text{-}R^2 \qquad (1)$$

wherein X and Y are each independently a hydrogen atom, a halogen atom or a methyl group, $R^1$ is a hydrogen atom, a halogen atom or a $C_{1-3}$ alkyl group, L is —CO—O—*, —O—CO—* or —O—, provided that * represents the binding position to $R^2$, and $R^2$ is a cyclic alkyl group, a monovalent aromatic hydrocarbon group or a $C_{1-6}$ linear alkyl group, provided that the $C_{1-6}$ linear alkyl group as $R^2$ may have an etheric oxygen atom in a carbon-carbon bond, and the hydrogen atom in the cyclic alkyl group, the monovalent aromatic hydrocarbon group or the $C_{1-6}$ linear alkyl group as $R^2$ may be replaced with a halogen atom.

The cyclic alkyl group as $R^2$ may, for example, be a cyclobutyl group, a cyclopentyl group or a cyclohexyl group. The monovalent aromatic hydrocarbon group may, for example, be a phenyl group or a naphthyl group. The $C_{1-6}$ linear alkyl group may, for example, be a methyl group, an ethyl group, a n-propyl group, an i-propyl group, a n-butyl group or an i-butyl group.

The groups in the formula (1) are preferably as follows, whereby the specific polymer is readily obtained.

X and Y are each independently preferably a hydrogen atom, a fluorine atom or a chlorine atom, and it is more preferred that both are hydrogen atoms.

$R^1$ is preferably a $C_{1-3}$ alkyl group, particularly preferably a methyl group.

L is preferably —CO—O—* or —O—CO—*, particularly preferably —CO—O—*.

$R^2$ is preferably a cyclohexyl group, a phenyl group, a $C_{1-4}$ linear alkyl group, a $C_{1-4}$ linear fluoroalkyl group, or a $C_{2-5}$ linear alkyl group having an etheric oxygen atom in a carbon-carbon bond, particularly preferably a $C_{1-4}$ linear alkyl group or a $C_{1-4}$ linear fluoroalkyl group.

As the compound represented by the formula (1), a compound represented by the formula (1-1) is preferred.

$$CH_2=C(CH_3)-CO-O-R^{21} \quad (1\text{-}1)$$

wherein $R^{21}$ is a cyclohexyl group, a phenyl group, a $C_{1-4}$ linear alkyl group, a $C_{1-4}$ linear fluoroalkyl group or a $C_{2-3}$ linear alkyl group having an etheric oxygen atom in a carbon-carbon bond.

$R^{21}$ is preferably a $C_{1-4}$ linear alkyl group or a $C_{1-4}$ linear fluoroalkyl group.

(Aqueous Medium)

The aqueous medium may, for example, be water or a mixture of water and a water-soluble organic solvent.

The water-soluble organic solvent may, for example, be tert-butanol, propylene glycol or dipropylene glycol. In the mixture of water and the water-soluble organic solvent, the concentration of the water-soluble organic solvent is preferably at most 10 mass %. The aqueous medium is preferably water alone.

(Water-Soluble Polymerization Initiator)

The water-soluble polymerization initiator is preferably a water-soluble radical initiator or a water-soluble redox catalyst.

The water-soluble radical initiator is preferably a persulfate such as ammonium persulfate or potassium persulfate, or a water-soluble organic peroxide such as disuccinic peroxide, bisglutaric peroxide or tert-butyl hydroperoxide.

The water-soluble redox catalyst is preferably a combination of an oxidizing agent such as bromic acid or its salt, chloric acid or its salt, persulfuric acid or its salt, permanganic acid or its salt, or hydrogen peroxide, and a reducing agent such as sulfurous acid or its salt, bisulfite salt, thiosulfuric acid or its salt, an organic acid or an inorganic salt. The persulfate is preferably potassium persulfate or ammonium persulfate. The sulfite is preferably sodium sulfite. The inorganic salt may be a combination of sulfate anion, sulfite anion or chloride anion, and a metal ion. The metal ion is preferably a transition metal ion, such as manganese, iron, cobalt, nickel, copper, zinc, cerium or silver ion, and is particularly preferably iron ion. The inorganic salt is preferably iron(II) sulfate.

The water-soluble polymerization initiator is preferably the water-soluble redox catalyst, more preferably a combination of potassium persulfate and sodium sulfite or a combination of potassium persulfate, sodium sulfite and an inorganic salt, further preferably a combination of potassium persulfate and sodium sulfite or a combination of potassium persulfate, sodium sulfite and iron(II) sulfate.

In order to facilitate progress of polymerization of the compound (1), the pH in the reaction system is preferably from 3 to 10, more preferably from 6 to 8. For adjustment, a sulfite such as sodium sulfite, ammonia, sodium hydroxide, hydrochloric acid or the like may be added as the case requires.

As the water-soluble polymerization initiator, two or more types may be used in combination. As a method of charging the water-soluble polymerization initiator, the entire amount may be charged to the reaction system before the polymerization reaction is initiated, or the initiator may be added to the reaction system continuously or intermittently.

The amount of the compound (1) used is, to 100 parts by mass of the aqueous medium, preferably from 0.0001 to 1.0 parts by mass, more preferably from 0.001 to 0.5 parts by mass. Within such a range, a decrease in the polymerization rate is prevented, and when the fluorinated polymer is produced in step 2, the amount of the specific polymer present with the fluorinated polymer can be reduced. As the method of charging the compound (1), preferred is initial batch addition of adding the entire amount to the reaction system before the polymerization reaction is initiated.

The amount of the water-soluble polymerization initiator used is, to 1 mol of the compound (1), preferably from 0.1 to 5.0 mol, more preferably from 0.1 to 2.0 mol, further preferably from 0.1 to 1.5 mol, particularly preferably from 0.2 to 1.0 mol.

The polymerization temperature of the compound (1) is preferably from 10 to 95° C., more preferably from 50 to 90° C. The polymerization time is, in the case of batch treatment, preferably from 5 to 400 minutes, more preferably from 5 to 300 minutes. As the pressure condition at the time of polymerization, reduced pressure condition or normal pressure condition is preferred.

By the polymerization, an aqueous dispersion containing the specific polymer is obtained. The specific polymer is in the form or particles, which are uniformly dispersed in the aqueous medium. The aqueous dispersion is colloidal.

It is estimated that particles of the specific polymer (hereinafter sometimes referred to as "specific particles") adsorb and incorporate the specific fluorinated monomer at hydrophobic moiety at the time of polymerization of the specific fluorinated monomer described later, to solubilize the specific fluorinated monomer, and by adding the initiator, the specific fluorinated monomer is polymerized in the particles of the specific particles. Further, it is estimated that the specific particles contribute to stabilization of dispersion in the aqueous medium and in the organic solvent.

D50 of the specific particles is preferably from 10 to 1,000 nm, more preferably from 10 to 300 nm, further preferably from 10 to 200 nm, particularly preferably from 10 to 150 nm.

The specific particles are constituted by the polymer having units based on the compound (1).

The content of the units based on the compound (1) in the polymer is, to all the units in the polymer, preferably at least 50 mass %, more preferably at least 70 mass %, further preferably at least 90 mass %. The upper limit is 100 mass %.

By the above polymerization, a fluorinated polymer aqueous dispersion containing the specific particles having D50 of from 10 to 1,000 nm in an amount of from 0.0001 to 1.0 parts by mass per 100 parts by mass of the aqueous medium will readily be obtained. Per 100 parts by mass of the aqueous medium, the specific particles are contained preferably in an amount of from 0.005 to 0.5 parts by mass, more preferably from 0.002 to 0.1 parts by mass.

<Step 2>

Step 2 is to produce the fluorinated polymer by polymerizing at least one fluorinated monomer selected from tetrafluoroethylene, chlorotrifluoroethylene and vinylidene fluoride (that is, the specific fluorinated monomer) in the aqueous medium in which the specific polymer is present, obtained in step 1.

Polymerization of the specific fluorinated monomer is conducted preferably by using the water-soluble polymerization initiator, and as the water-soluble polymerization initiator, the water-soluble polymerization initiators described in step 1 may be mentioned. It is also preferred to further use a chain transfer agent for polymerization of the specific fluorinated monomer.

The fluorinated polymer may be a tetrafluoroethylene polymer having units based on tetrafluoroethylene (TFE) (hereinafter sometimes referred to as "TFE units"), polyvinylidene fluoride (hereinafter sometimes referred to as "PVdF"), polychlorotrifluoroethylene or a copolymer of ethylene and chlorotrifluoroethylene. Among them, a tetrafluoroethylene polymer is preferred.

The fluorinated polymer may be a copolymer with a monomer other than the specific fluorinated monomer.

As other monomer, a fluorinated monomer such as hexafluoropropylene (hereinafter sometimes referred to as "HFP"), a perfluoro(alkyl vinyl ether) (hereinafter sometimes referred to as "PAVE") and a fluoroalkylethylene (hereinafter sometimes referred to as "FAE") may be mentioned.

As PAVE, $CF_2=CFOCF_3$ (hereinafter sometimes referred to as "PMVE"), $CF_2=CFOCF_2CF_3$, $CF_2=CFOCF_2CF_2CF_3$ (hereinafter sometimes referred to as "PPVE"), $CF_2=CFOCF_2CF_2CF_2CF_3$, and $CF_2=CFO(CF_2)_8F$ may be mentioned, and PMVE and PPVE are preferred.

As FAE, $CH_2=CH(CF_2)_2F$ (hereinafter sometimes referred to as "PFEE"), $CH_2=CH(CF_2)_3F$, $CH_2=CH(CF_2)_4F$ (hereinafter sometimes referred to as "PFBE"), $CH_2=CF(CF_2)_3H$, and $CH_2=CF(CF_2)_4H$ may be mentioned, and PFEE and PFBE are preferred.

Further, as other monomer, ethylene, propylene, vinyl chloride, vinylidene chloride and vinyl fluoride may also be mentioned.

Further, as other monomer, a monomer having an oxygen-containing polar group may also be mentioned. The oxygen-containing polar group is preferably a hydroxy group, a carbonyl group-containing group, an acetal group or an oxycycloalkane group, more preferably an acid anhydride residue. The monomer having an acid anhydride residue is preferably a monomer having a cyclic acid anhydride residue, preferably itaconic anhydride (hereinafter sometimes referred to as "IAH"), citraconic anhydride, 5-norbornene-2,3-dicarboxylic anhydride (another name: himic anhydride, hereinafter sometimes referred as "NAH") or maleic anhydride.

The tetrafluoroethylene copolymer may be a copolymer of TFE and PAVE, a copolymer of TFE and HFP (hereinafter sometimes referred to as "FEP"), a copolymer of TFE and ethylene (hereinafter sometimes referred to as "ETFE"), a copolymer of TFE and propylene, and a copolymer of TFE and vinylidene fluoride.

However, the tetrafluoroethylene polymer of the present invention does not include the following specific high heat resistant polymer.

Specific high heat resistant polymer: a polymer having a first endothermic peak by temperature increase at 10° C./min at 340° C. or higher, and an endothermic peak after the first endothermic peak at 340° C. or higher, as measured by a differential scanning calorimetry.

The tetrafluoroethylene polymer of the present invention has melt-formability or elasticity.

The tetrafluoroethylene polymer in the present invention is preferably ETFE, PFA or FEP, particularly preferably the after-described ETFE or the after-described PFA.

FEP is preferably FEP having a proportion of the HFP units to the total amount of the TFE units and the HFP units of from 1 to 15 mol %, more preferably from 5 to 13 mol %.

ETFE has TFE units and units based on ethylene (hereinafter sometimes referred to as "E units"). In the copolymer having TFE units and E units, the proportion of the E units to the total amount of the E units and the TFE units is preferably from 20 to 70 mol %, more preferably from 25 to 60 mol %, particularly preferably from 35 to 55 mol %.

To all the units constituting ETFE, the total proportion of the E units and the TFE units is preferably at least 80 mol %, more preferably at least 85 mol %, further preferably at least 90 mol %.

Further, EFTE preferably has FAE units in addition to the E units and the TFE units. The proportion of the FAE units to total amount of the E units and the TFE units is preferably from 0.1 to 10 mol %, more preferably from 0.1 to 5 mol %, particularly preferably from 0.2 to 4 mol %.

Further, ETFE preferably has units based on a monomer having an oxygen-containing polar group in addition to the E units and the TFE units. The proportion of the units based on a monomer having an oxygen-containing polar group to the total amount of the E units and the TFE units is preferably from 0.01 to 5 mol %, more preferably from 0.05 to 3 mol %. The method for producing a fluorinated polymer of the present invention employs emulsion polymerization using an aqueous medium, and even when a monomer having an oxygen-containing polar group, such as a monomer having a highly hydrophilic cyclic acid anhydride residue is used, it is not dissolved too much, copolymerization with e.g. tetrafluoroethylene is easy, and the oxygen-containing polar group can readily be introduced to the fluorinated polymer.

The copolymer of TFE and PAVE has TFE units and PAVE units. As the copolymer of TFE and PAVE, preferred is a copolymer having a proportion of the PAVE units to the total amount of the TFE units and the PAVE units of at least 0.1 mol % and less than 20 mol % (hereinafter sometimes referred to as "PF1") or a copolymer having a proportion of the PAVE units of from 20 to 70 mol % (hereinafter sometimes referred to as "PF2").

In PF1, the proportion of the PAVE units to the total amount of the TFE units and the PAVE units is preferably from 0.5 to 10 mol %, more preferably from 0.5 to 5.0 mol %.

PF1 may be a copolymer consisting solely of the TFE units and the PAVE units, or may contain at least one type of units based on other monomer. As other monomer, preferred is other fluorinated monomer or a monomer having an oxygen-containing polar group. As other fluorinated monomer, hexafluoropropylene is preferred. As the monomer having an oxygen-containing polar group, NAH is preferred. When units based on other monomer are contained, the proportion of the units based on other monomer is, to the total amount of the TFE units and the PAVE units, preferably from 0.1 to 10 mol %, more preferably from 0.1 to 6 mol %. The proportion of the units based on the monomer having an oxygen-containing polar group is preferably from 0.01 to 5 mol %, more preferably from 0.05 to 3 mol %.

The total proportion of the TFE units and the PAVE units to all the units constituting PF1 is preferably at least 80 mol %, more preferably at least 85 mol %, further preferably at least 90 mol %.

PF1 will sometimes be referred to as "PFA".

In PF2, the proportion of the PAVE units to the total amount of the TFE units and the PAVE units is preferably from 20 to 50 mol %, more preferably from 25 to 45 mol %.

Further, it is also preferred that in addition to the TFE units and the PAVE units, units based on a monomer having a fluorine atom and a nitrile group (hereinafter sometimes referred to as "CN units") or units based on a monomer having a fluorine atom and a plurality of vinyl groups (hereinafter sometimes referred to as "DV units") are contained.

As the monomer having a fluorine atom and a nitrile group, $CF_2=CFO(CF_2)_5CN$, and $CF_2=CFOCF_2CF(CF_3)CF_2CF_2CN$ may be mentioned.

As the monomer having a fluorine atom and a plurality of vinyl groups, $CF_2=CFO(CF_2)_3OCF=CF_2$, $CF_2=CFO(CF_2)_4OCF=CF_2$, and $CH_2=CH(CF_2)_6CH=CH_2$ may be mentioned.

The proportion of the CN units to the total amount of the TFE units and the PAVE units is preferably from 0.1 to 10.0 mol %, more preferably from 0.5 to 5.0 mol %.

The proportion of the DV units to the total amount of the TFE units and the PAVE units is preferably from 0.01 to 1.0 mol %, more preferably from 0.01 to 0.5 mol %.

The total proportion of the TFE units and the PAVE units to all the units constituting PF2 is preferably at least 80 mol %, more preferably at least 85 mol %, further preferably at least 90 mol %.

The specific fluorinated monomer and other monomer are charged to the reaction system (that is a polymerization vessel) by a conventional method. For example, TFE is charged to the reaction system continuously or intermittently so that the polymerization pressure will be predetermined pressure. Further, for example, other monomer is dissolved in an aqueous medium and the obtained solution is charged to the reaction system continuously or intermittently.

In a case where the water-soluble polymerization initiator is used, the water-soluble polymerization initiator may be added to the reaction system all at once or may be added dividedly.

In a case where a chain transfer agent is used, as the chain transfer agent, an alcohol, a hydrocarbon or a hydrofluorocarbon, which has an effect to stabilize the terminal structure of a resin, is preferred, and an alcohol or a hydrocarbon is more preferred. As the alcohol, methanol or ethanol is preferred, which is easily dissolved in water and which is easily separated from the obtained copolymer after production. As the hydrocarbon, n-pentane, cyclohexane, methane or propane is preferred, which has high thermal stability when introduced to the terminal structure of a resin, and which also has high chain transfer property.

The polymerization temperature is preferably from 10 to 95° C., more preferably from 15 to 90° C. The polymerization pressure is preferably from 0.5 to 4.0 MPa, more preferably from 0.6 to 3.5 MPa. The polymerization time is, in the case of batch treatment, preferably from 90 to 1,000 minutes, more preferably from 90 to 700 minutes.

The production of the specific polymer and the production of the fluorinated polymer may be conducted continuously in a single polymerization vessel.

Further, in the production method of the present invention, so long as the specific particles are formed in the production of the specific polymer, production of the fluorinated polymer may be conducted before the compound (1) is completely consumed in the production of the specific polymer. In such a case, it is considered that a fluorinated polymer having units based on the compound (1) may sometimes form.

In a case where the production of the specific polymer and the production of the fluorinated polymer are continuously carried out, the amount of the specific polymer which is obtained in step 1 and is present in step 2, is, per 100 parts by mass of the aqueous medium, preferably from 0.0001 to 1.0 parts by mass, more preferably from 0.001 to 0.5 parts by mass.

In a case where the production of the specific polymer and the production of the fluorinated polymer are not carried out continuously, step 1 may be omitted. Instead of step 1, a commercially available specific polymer is prepared, and the amount of the specific polymer present in step 2 is adjusted to be preferably from 0.0001 to 1.0 parts by mass, more preferably from 0.001 to 0.5 parts by mass, per 100 parts by mass of the aqueous medium.

As the commercially available specific polymer, poly(2,2,3,3,4,4,4-heptafluorobutyl methacrylate), manufactured by Adrich may, for example, be mentioned.

Of the commercially available specific polymer also, D50 is preferably from 10 to 1,000 nm, more preferably from 10 to 300 nm, further preferably from 10 to 200 nm, particularly preferably from 10 to 150 nm.

Further, the content of the units based on the compound (1) in the commercially available polymer is, to all the units in the polymer, preferably at least 50 mass %, more preferably at least 70 mass %, further preferably at least 90 mass %. The upper limit is 100 mass %.

By the above procedure, a fluorinated polymer aqueous dispersion containing particles containing a fluorinated polymer having units based on the specific fluorinated monomer and having D50 of from 20 to 3,000 nm, and the specific particles, is easily obtained.

Further, as mentioned above, as it is estimated that the specific fluorinated monomer is polymerized in the specific particles at the time of polymerization of the monomer, the formed fluorinated polymer particles incorporate the specific particles therein, whereby particles containing the fluorinated polymer and the specific polymer may sometimes form. Particularly in a case where the specific particles have high affinity with the specific fluorinated monomer (for example, in a case where the specific particles are particles of the specific polymer having fluorine atoms), it is considered that particles containing the fluorinated polymer and the specific polymer and having D50 of from 20 to 3,000 nm readily form.

The fluorinated polymer aqueous dispersion of the present invention is an aqueous dispersion containing the above mentioned aqueous medium, particles containing the fluorinated polymer and having D50 of from 20 to 3,000 nm, and the specific polymer contained as particles in the aqueous medium or contained in the particles containing the fluorinated polymer.

Hereinafter, particles containing the fluorinated polymer mean particles which may contain the specific polymer unless otherwise specified.

The fluorinated polymer aqueous dispersion contains the particles containing the fluorinated polymer preferably in an amount per 100 parts by mass of the aqueous medium of from 1.0 to 50.0 parts by mass, more preferably from 3 to 40 parts by mass.

The fluorinated polymer aqueous dispersion contains the specific polymer preferably in an amount per 100 parts by mass of the aqueous medium of from 0.0001 to 1.0 parts by mass.

Further, in the fluorinated polymer aqueous dispersion, the content of the specific polymer per 100 parts by mass of the particles containing the fluorinated polymer is preferably from 0.001 to 5.00 parts by mass, more preferably from 0.005 to 3.00 parts by mass.

The particle size of the particles containing the fluorinated polymer is preferably from 20 to 1,000 nm.

The aqueous dispersion containing the particles containing the fluorinated polymer of the present invention does not necessarily requires an emulsifier as an essential component, and accordingly it is readily converted to a dispersion in an organic solvent such as N-methylpyrrolidone or acetone by solvent replacement.

The aqueous dispersion containing the particles containing the fluorinated polymer is mixed with an organic solvent, followed by dehydration by evaporation, by means of anhydrous sodium sulfate, or the like to obtain a dispersion in an organic solvent.

In the aqueous dispersion containing the fluorinated polymer of the present invention, the fluorinated polymer is stably dispersed even without using an emulsifier. Accordingly, the aqueous dispersion can suitably be used for coating applications, a binder, etc.

The polymer composition of the present invention comprises the specific polymer and a fluorinated polymer having units based on the specific fluorinated monomer, and having a peak derived from the units based on the compound (1) at from 1,500 to 1,800 $cm^{-1}$ in an infrared absorption spectrum. It is particularly preferably a composition having peaks at from 1,700 to 1,800 $cm^{-1}$.

The peak in the infrared spectrum is a peak derived from the units based on the compound (1) present in the specific polymer, and in some cases, may be a peak derived from the units based on the compound (1) which may sometimes be contained in the fluorinated polymer.

The polymer composition of the present invention is readily obtained from the aqueous dispersion of the present invention obtained in step 2. That is, by agglomerating the polymer from the aqueous dispersion of the present invention, a powder of the polymer composition can be obtained. The powdery polymer composition obtained by agglomeration is homogenized e.g. by melt kneading to obtain a forming material in the form of pellets, particles, etc., containing the fluorinated polymer and the specific polymer, or, from the powdery polymer composition obtained by agglomeration, a formed product may be obtained by melt-forming.

As the agglomeration method, freeze agglomeration, acid agglomeration, base agglomeration and agglomeration using a coagulant may be mentioned, but the method is not limited thereto.

In the case of freeze agglomeration, the agglomeration temperature is preferably from 0 to 5° C. The agglomeration time is preferably at least 1 hour, more preferably at least 2 hours.

In the case of acid agglomeration, preferred is a method of adding a solution containing an acid to the aqueous dispersion of the present invention. The acid to be added may, for example, be hydrochloric acid, nitric acid, sulfuric acid, oxalic acid or hydrofluoric acid, and is preferably hydrochloric acid. The concentration of the acid in the solution containing the acid is preferably from 0.1 to 50 mass %, more preferably from 1 to 30 mass %, further preferably from 1 to 10 mass %.

As base agglomeration, preferred is a method of adding a solution containing a base to the aqueous dispersion of the present invention. The base to be added may, for example, be sodium hydroxide, potassium hydroxide or ammonium carbonate, and is preferably sodium hydroxide. The concentration of the base in the solution containing the base is preferably from 0.1 to 50 mass %, more preferably from 1 to 30 mass %, further preferably from 1 to 10 mass %.

For agglomeration by a coagulant, a known coagulant may be used. The known coagulant may be an aluminum salt, a calcium salt or a magnesium salt. Specifically, aluminum sulfate, alum represented by the formula M'Al(SO$_4$)$_2$·12H$_2$O (wherein M' is a monovalent cation other than lithium), calcium nitrate or magnesium sulfate, and is preferably alum, more preferably potassium alum wherein M is potassium.

As the agglomeration method, base agglomeration is preferred, whereby agglomeration is very likely to proceed. The reason is not clearly understood, but is considered to be such that under the basic conditions, the specific polymer is hydrolyzed, and the fluorinated polymer can be made to efficiently proceed.

The melting point of the fluorinated polymer in the polymer composition of the present invention is preferably at least 150° C., more preferably from 150 to 330° C., further preferably from 180 to 320° C., further more preferably from 220 to 310° C., still more preferably from 260 to 300° C. When the melting point is within such a range, the fluorinated polymer has high heat resistance.

EXAMPLES

Now, the present invention will be described in further detail with reference to Examples and Comparative Examples. However, it should be understood that the present invention is by no means restricted thereto.

In the following Examples, the fluorinated polymer having a peak in a range of from 1,700 to 1,800 $cm^{-1}$ in an infrared absorption spectrum, means the fluorinated polymer containing the specific polymer used for producing the fluorinated polymer, that is the polymer composition containing the specific polymer and the fluorinated polymer (provided that presence of the fluorinated polymer having units based on the compound (1) is not denied).

Even when the infrared absorption spectrum is not measured, the fluorinated polymers obtained in Examples are confirmed to be the polymer compositions containing the specific polymer and the fluorinated polymer.

Measurement methods and evaluation methods are as follows.

D50 (nm) of polymer particles in aqueous dispersion:

Measured by a laser diffraction/scattering particle size distribution measuring apparatus (manufactured by Otsuka Electronics Co., Ltd., ELSZ) using the aqueous dispersion of the polymer particles as a sample.

Confirmation of Specific Polymer:

The specific polymer being obtained was confirmed by $^1$H-NMR analysis.

Measurement of Q (mm$^3$/s):

The Q value (also called volume flow rate) was measured by Flow Tester (manufactured by Shimadzu Corporation), at 380° C. for PFA, at 297° C. for ETFE and FEP, under a load of 7 kg, 30 kg or 50 kg.

Proportion of Units in Polymer:

The proportions of the respective units in the polymer were obtained by $^{19}$F-NMR analysis, fluorine content analysis, and infrared absorption spectrum analysis.

Storage Elastic Modulus G' of Polymer:

The value measured with respect to the polymer, using a rubber processing analyzer (manufactured by Alpha Technologies, RPA2000), in accordance with ASTM D5289 and ASTM D6204, at a temperature of 100° C. at an amplitude of 0.5 at a frequency of 50 cycles/min, was taken as the storage elastic modulus G'. The storage elastic modulus G' of the polymer is a measure of the rubber physical properties of a crosslinked rubber article.

Melting Point (° C.):

The melting point is a temperature by an endothermic peak by melting measured by a differential scanning thermal analyzer (manufactured by NETZSCH, DSC 3500Sirius) in a nitrogen atmosphere. The temperature transition program during the measurement is such that −20° C.→310° C.→−70° C.→310° C., and the temperature increasing rate is 10° C./min, and the temperature decreasing rate is 5° C./min. The temperature at the endothermic peak by the heat of melting at the second temperature increase after the temperature is decreased to −70° C. is taken as the "melting point". Thermogravimetric loss temperature (5% loss, 1% loss):

The temperatures at which the weight losses are 5% and 1%, respectively, when the temperature is increased at 10° C./min in an air atmosphere, are measured by a thermogravimetric differential measuring apparatus (TG-DTA) (manufactured by NETZSCH, STA 2500 Regulus).

[Preparation of Aqueous Dispersion of Specific Polymer]

Reference Example 1

The system in a 1 L glass polymerization vessel was replaced with nitrogen, the pressure was reduced to −0.1 MPaG, and ultrapure water (740 g), sodium sulfite (88 mg) and n-butyl methacrylate (hereinafter sometimes referred to as "nBMA") (330 mg) were charged. While the solution in the polymerization vessel was stirred, the temperature was increased to 60° C., and 3.8 ml of a solution (5 mass %) having potassium persulfate (hereinafter sometimes referred to as "KPS") dissolved in deionized water was injected into the polymerization vessel to polymerize nBMA. 30 Minutes later, the mixed liquid was withdrawn and an aqueous dispersion of poly(nBMA) was obtained. D50 of poly(nBMA) particles in the aqueous dispersion was 60 nm.

Then, water was removed under reduced pressure, and the residue was vacuum-dried at room temperature. The obtained poly(nBMA) was dissolved in acetone-d6 and NMR analysis was conducted.

$^1$H-NMR (acetone-d6): 1.0 ppm (br, 3H), 1.1 ppm (br, 2H), 1.3 ppm (br, 1H), 1.9-2.4 ppm (br, 6H), 4.2 ppm (br, 2H)

Reference Example 2

The same operation as in Reference Example 1 was conducted except that 2,2,3,3,4,4,4-heptafluorobutyl methacrylate (hereinafter sometimes referred to as "MHFBE") (624 mg) was used instead of nBMA (330 mg). D50 of poly(MHFBE) particles in the aqueous dispersion was 131 nm.

$^1$H-NMR (acetone-d6): 1.1 ppm (br, 2H), 1.3 ppm (br, 1H), 1.9-2.4 ppm (br, 2H), 4.8 ppm (br, 2H)

Reference Example 3

The system in a 1 L glass polymerization vessel was replaced with nitrogen, the pressure was reduced to −0.1 MPaG, and ultrapure water (740 g), sodium sulfite (88 mg), nBMA (330 mg), iron(II) sulfate heptahydrate (11 mg) and CHELEST HC (17 mg) were charged. While the solution in the polymerization vessel was stirred, the temperature was increased to 60° C., and 3.8 ml of a solution (5 mass %) having KPS dissolved in deionized water was injected into the polymerization vessel to polymerize nBMA. 30 Minutes later, the reaction liquid was withdrawn from the polymerization vessel and an aqueous dispersion of poly(nBMA) was obtained. D50 of poly(nBMA) particles in the aqueous dispersion was 86 nm.

Reference Example 4

The same operation as in Reference Example 3 was conducted except that i-butyl methacrylate (330 mg) was used instead of nBMA (330 mg). D50 of poly(i-butyl methacrylate) particles in the aqueous dispersion was 58.3 nm.

Reference Example 5

The same operation as in Reference Example 3 was conducted except that cyclohexyl methacrylate (390 mg) was used instead of nBMA (330 mg). D50 of poly(cyclohexyl methacrylate) in the aqueous dispersion was 94.3 nm.

Reference Example 6

The same operation as in Reference Example 3 was conducted except that phenyl methacrylate (377 mg) was used instead of nBMA (330 mg). D50 of poly(phenyl methacrylate) particles in the aqueous dispersion was 41.6 nm.

Reference Example 7

The same operation as in Reference Example 3 was conducted except that 2-methoxyethyl methacrylate (335 mg) was used instead of nBMA (330 mg). D50 of poly(2-methoxyethyl methacrylate) particles in the aqueous dispersion was 103.7 nm.

Reference Example 8

The same operation as in Reference Example 3 was conducted except that MHFBE (624 mg) was used instead of nBMA (330 mg). D50 of poly(MHFBE) particles in the aqueous dispersion was 90.6 nm.

Comparative Example 1

The system in a 1.2 L stainless steel polymerization vessel was replaced with nitrogen, the pressure was reduced to −0.1 MPaG, and ultrapure water (630 g), t-butanol (72 g), an aqueous $CF_3CF_2OCF_2CF_2OCF_2COONH_4$ solution (30 mass %, 12 g) and an aqueous NaOH solution (2 mass %, 3.5 g) were charged. While the solution in the polymerization vessel was stirred, the temperature was increased to 60° C., and the pressure was elevated to 1.9 MPaG with a monomer mixture TFE/E=86/14 (molar ratio). A solution (5 mass %) having KPS dissolved in deionized water was injected into the polymerization vessel. Upon start of pressure drop in the polymerization vessel, a monomer mixture TFE/E=54/46 (molar ratio) was added so as to keep the internal pressure of the polymerization vessel to 1.9 MPaG to make polymerization proceed. At a point when the amount of the monomer mixture continuously charged reached 50 g, the polymerization vessel was cooled to room temperature, and the gas in the polymerization vessel was discharged to the air. The polymerization time was 210 minutes. The solid content concentration of the obtained copolymer aqueous dispersion was about 7%. D50 of copolymer particles in the aqueous dispersion was 297 nm.

The aqueous dispersion was cooled and the copolymer particles were agglomerated to collect a powder. The copolymer powder was dried at 150° C. The Q value of the obtained copolymer powder under a load of 50 kg was 115 mm$^3$/s, and the molar ratio of the TFE units/E units in the copolymer was 54.7/45.3.

[Production of Fluorinated Polymer]

Example 1

[Step 1]

The system in a 2.1 L stainless steel polymerization vessel was replaced with nitrogen, the pressure was decreased to −0.1 MPaG, and ultrapure water (1,274 g), sodium sulfite (152 mg), nBMA (568 mg), iron(II) sulfate heptahydrate (19 mg) and CHELEST HC (29 mg) were charged. While the solution in the polymerization vessel was stirred, the temperature was increased to 60° C., and 6.5 ml of a solution (5 mass %) having KPS dissolved in deionized water was injected into the polymerization vessel to polymerize nBMA. From the amount of nBMA charged, the amount of poly(nBMA) in 100 parts by mass of the aqueous medium is 0.044 parts by mass.

[Step 2]

Then, the pressure in the polymerization vessel was elevated to 2.6 MPaG with a monomer mixture TFE/E=86/14 (molar ratio), and 19.5 ml of a solution (5 mass %) having KPS dissolved in deionized water was injected into the polymerization vessel. Upon start of pressure drop in the polymerization vessel, a monomer mixture TFE/E=54/46 (molar ratio) was added so as to keep the internal pressure of the polymerization vessel to 2.6 MPaG to make polymerization proceed. After every injection of 5 g of the monomer mixture, an aqueous sodium sulfite solution (1.8 mass %, 2 mL) was added to the polymerization vessel. At a point when the amount of the monomer mixture continuously charged reached 140 g, the polymerization vessel was cooled to room temperature. The polymerization time was 377 minutes. The solid content concentration of the obtained fluorinated polymer aqueous dispersion was about 9%. Further, D50 of fluorinated polymer particles in the fluorinated polymer aqueous dispersion was 240 nm.

The aqueous dispersion was cooled and the fluorinated polymer particles were agglomerated to collect a powder. The fluorinated polymer powder was dried at 150° C. The Q value of the obtained fluorinated polymer powder under a load of 50 kg was 56 mm$^3$/s, the molar ratio of the TFE units/E units in the fluorinated polymer was 54.7/45.3. The melting point of the obtained fluorinated polymer was 270° C. With respect to the fluorinated polymer, a peak derived from the specific polymer was detected at 1,740 cm$^{-1}$ in an infrared absorption spectrum.

To the obtained fluorinated polymer aqueous dispersion (20 g), N-methylpyrrolidone (hereinafter sometimes referred to as "NMP") (20 g) was added to prepare a mixed liquid. Then, water was removed under reduced pressure, and anhydrous magnesium sulfate was added to the residue. The anhydrous magnesium sulfate was removed by filtration to obtain a NMP dispersion of ETFE. The solid content concentration was about 9%.

Example 2

[Step 1]

The system in a 1.2 L stainless steel polymerization vessel was replaced with nitrogen, the pressure was decreased to −0.1 MPaG, and ultrapure water (740 g), sodium sulfite (88 mg) and MHFBE (624 mg) were charged. While the solution in the polymerization vessel was stirred, the temperature was increased to 60° C., and 3.8 ml of a solution (5 mass %) having KPS dissolved in deionized water was injected into the polymerization vessel to polymerize MHFBE.

From the amount of MHFBE charged, the amount of poly(MHFBE) in 100 parts by mass of the aqueous medium was 0.084 parts by mass.

[Step 2]

Then, the pressure in the polymerization vessel was elevated to 1.9 MPaG with a monomer mixture TFE/E=86/14 (molar ratio), and 11.3 ml of a solution (5 mass %) having KPS dissolved in deionized water and PFBE (0.85 g) were injected into the polymerization vessel. Upon start of pressure drop in the polymerization vessel, a monomer mixture TFE/E=54/46 (molar ratio) was added so as to keep the internal pressure of the polymerization vessel to 1.9 MPaG to make polymerization proceed. At a point when the amount of the monomer mixture added reached 40 g, PFBE (0.85 g) was added. At a point when the amount of the monomer mixture continuously charged reached 60 g, the polymerization vessel was cooled to room temperature. The polymerization time was 690 minutes. The solid content concentration of the obtained fluorinated polymer aqueous dispersion was about 8%. Further, D50 of fluorinated polymer particles in the aqueous dispersion was 221 nm.

The aqueous dispersion was cooled and the fluorinated polymer particles were agglomerated to collect a powder. The fluorinated polymer powder was dried at 150° C. The Q value of the obtained fluorinated polymer powder under a load of 50 kg was 0.35 mm$^3$/s, and the molar ratio of TFE units/E units/PFBE units in the fluorinated polymer was 54.2/45.1/0.67. The melting point of the obtained fluorinated polymer was 265° C. With respect to the obtained fluorinated polymer, a peak derived from the specific polymer was detected at 1,760 cm$^{-1}$ in an infrared absorption spectrum.

Example 3

[Step 1]

The system in a 2.1 L stainless steel polymerization vessel was replaced with nitrogen, the pressure was decreased to −0.1 MPaG, and ultrapure water (1,274 g), sodium sulfite (152 mg), nBMA (568 mg), iron(II) sulfate heptahydrate (19 mg) and CHELEST HC (29 mg) were charged. While the solution in the polymerization vessel was stirred, the temperature was increased to 60° C., and 10 ml of a solution (3.3 mass %) having KPS dissolved in deionized water was injected into the polymerization vessel to polymerize nBMA.

From the amount of nBMA charged, the amount of poly(nBMA) in 100 parts by mass of the aqueous medium is 0.044 parts by mass.
[Step 2]

30 Minutes later, the pressure was elevated to 2.6 MPaG with a monomer mixture TFE/E=86/14 (molar ratio), and 40 ml of a solution (3.3 mass %) having KPS dissolved in deionized water, PFBE (1.5 g) and an aqueous IAH solution (5 mass %, 2 mL) were injected into the polymerization vessel. Upon start of pressure drop in the polymerization vessel, a monomer mixture of TFE/E=54/46 (molar ratio) was added so as to keep the internal pressure of the polymerization vessel to 2.6 MPaG, and after every charge of 10 g of the monomer mixture, an aqueous IAH solution (5 mass %, 2 mL) was added to make polymerization proceed. At a point when the amount of the monomer mixture continuously charged reached 50 g, the polymerization vessel was cooled to room temperature. The polymerization time was 450 minutes. The solid content concentration of the obtained fluorinated polymer aqueous dispersion was about 4%. Further, D50 of the fluorinated polymer particles in the aqueous dispersion was 135 nm.

The aqueous dispersion was cooled and the fluorinated polymer particles were agglomerated to collect a powder. The fluorinated polymer powder was dried at 150° C. The Q value of the obtained fluorinated polymer powder under a load of 50 kg was 13 mm$^3$/s, and the molar ratio of TFE units/E units/PFBE units/IAH units in the copolymer was 54.1/45.6/0.3/0.2.

Example 4

[Step 1]

The system in a 1.2 L stainless steel polymerization vessel was replaced with nitrogen, the pressure was decreased to −0.1 MPaG, and ultrapure water (740 g), sodium sulfite (88 mg) and MHFBE (624 mg) were charged. While the solution in the polymerization vessel was stirred, the temperature was increased to 60° C., and 3.8 ml of a solution (5 mass %) having KPS dissolved in deionized water was injected into the polymerization vessel to polymerize MHFBE.

From the amount of MHFBE charged, the amount of poly(MHFBE) in 100 parts by mass of the aqueous medium is 0.084 parts by mass.
[Step 2]

30 Minutes later, the pressure was elevated to 1.9 MPaG with a monomer mixture TFE/E=86/14 (molar ratio), and 15.1 ml of a solution (5 mass %) having KPS dissolved in deionized water, PFBE (1.1 g) and methanol (1.5 g) were injected into the polymerization vessel. Upon start of pressure drop in the polymerization vessel, a monomer mixture TFE/E=54/46 (molar ratio) was added so as to keep the internal pressure of the polymerization vessel to 1.9 MPaG to make polymerization proceed. At a point when the amount of the monomer mixture continuously charged reached 30 g, the polymerization vessel was cooled to room temperature. The polymerization time was 407 minutes. The solid content concentration of the obtained fluorinated polymer aqueous dispersion was about 4%. Further, D50 of the fluorinated polymer particles in the aqueous dispersion was 141 nm.

The aqueous dispersion was cooled and the fluorinated polymer particles were agglomerated to collect a powder. The fluorinated polymer powder was dried at 150° C. The Q value of the obtained fluorinated polymer powder under a load of 50 kg was 130 mm$^3$/s, and the molar ratio of TFE units/E units/PFBE units in the fluorinated polymer was 54.0/45.0/1.0.

Example 5

[Step 1]

The system in a 1.2 L stainless steel polymerization vessel was replaced with nitrogen, and under reduced pressure, ultrapure water (740 g), sodium sulfite (88 mg), nBMA (330 mg), iron(II) sulfate heptahydrate (11 mg) and CHELEST HC (17 mg) were charged. While the solution in the polymerization vessel was stirred, the temperature was increased to 60° C., and 3.8 ml of a solution (5 mass %) having KPS dissolved in deionized water was injected into the polymerization vessel to polymerize nBMA.

From the amount of nBMA charged, the amount of poly(nBMA) in 100 parts by mass of the aqueous medium is 0.044 parts by mass.
[Step 2]

30 Minutes later, the pressure was elevated to 1.4 MPaG with TFE, and 25 ml of a solution (5 mass %) having KPS dissolved in deionized water and PPVE (23.5 g) were injected into the polymerization vessel. Upon start of pressure drop in the polymerization vessel, TFE was added so as to keep the internal pressure of the polymerization vessel to 1.4 MPaG thereby to make polymerization proceed. After every injection of 3 g of the monomer mixture, an aqueous sodium sulfite solution (1.2 mass %, 1.9 mL) was added to the polymerization vessel. At a point when the amount of TFE continuously charged reached 30 g, the polymerization vessel was cooled to room temperature. The polymerization time was 197 minutes. The solid content concentration of the obtained fluorinated polymer aqueous dispersion was about 4%. Further, D50 of the fluorinated polymer particles in the aqueous dispersion was 131 nm.

The aqueous dispersion was cooled and the fluorinated polymer particles were agglomerated to collect a powder. The fluorinated polymer powder was dried at 150° C. The Q value of the obtained fluorinated polymer powder under a load of 50 kg was 680 mm$^3$/s, and the molar ratio of TFE units/PPVE units in the fluorinated polymer was 98.6/1.4.

Example 6

[Step 1]

A stainless steel pressure resistant reactor equipped with an anchor blade and having an internal volume of 2,100 mL was deaerated, and 1,000 g of ultrapure water, sodium sulfite (119 mg), nBMA (297 mg) and iron(II) sulfate heptahydrate (15 mg) were charged. While the solution in the polymerization vessel was stirred, the temperature was increased to 70° C., and 5 ml of a solution (5 mass %) having KPS dissolved in ultrapure water was injected into the polymerization vessel to polymerize nBMA.

From the amount of nBMA charged, the amount of poly(nBMA) in 100 parts by mass of the aqueous medium is 0.030 parts by mass.
[Step 2]

30 Minutes later, 82 g of PMVE and 17 g of TFE were charged (TFE:PMVE=25:75 molar ratio). The temperature was increased, and the internal pressure of the reactor when the internal temperature reached 80° C. was 1.14 MPaG. 40 ml of a solution (5 mass %) having ammonium persulfate dissolved in ultrapure water was added to initiate polymerization. Immediately after the addition, 0.7 g of 1,4-diiodoperfluorobutane and 10 g of ultrapure water were charged. At a point when the internal pressure of the reactor reached 1.13 MPaG as the polymerization proceeded, TFE was injected to elevate the internal pressure of the reactor to 1.14 MPaG. This operation was repeated, and after every injection of 8 g of TFE, 7 g of PMVE was also injected.

At a point when the total mass of TFE added reached 80 g, addition of the monomers injected after initiation of the polymerization (hereinafter referred to as "later-added monomers") was terminated, and the internal temperature of the reactor was decreased to 10° C. to terminate the polymerization reaction thereby to obtain a latex containing a fluorinated polymer (hereinafter sometimes referred to as "fluorinated elastic copolymer"). The polymerization time was 300 minutes. Further, the total masses of the later-added monomers added were 80 g of TFE and 63 g of PMVE, and the molar ratio calculated from the masses was TFE: PMVE=65:35. The solid content concentration of the obtained copolymer aqueous dispersion was about 13%. The latex was added to a 5 mass % aqueous solution of aluminum potassium sulfate to agglomerate and separate the fluorinated elastic copolymer. The fluorinated elastic copolymer was subjected to filtration, washed with deionized water and vacuum dried at 50° C. to obtain a white fluorinated elastic copolymer. The molar ratio of the respective monomers in the fluorinated elastic copolymer was TFE: PMVE=63.3:36.7, and the content of iodine atoms was 0.15 mass %. Further, the storage elastic modulus G' of the fluorinated elastic copolymer was 112 kPa.

Example 7

The same operation as in Example 6 was conducted except that i-butyl methacrylate (568 mg) was used instead of nBMA (568 mg). The polymerization time was 375 minutes. The solid content concentration of the obtained copolymer aqueous dispersion was about 13%.

The latex was added to a 5 mass % aqueous solution of aluminum potassium sulfate to agglomerate and separate the fluorinated elastic copolymer. The fluorinated elastic copolymer was subjected to filtration, washed with deionized water and vacuum dried at 50° C. to obtain a white fluorinated elastic copolymer. The molar ratio of the respective monomers in the fluorinated elastic copolymer was TFE: PMVE=64.7:35.3, and the content of iodine atoms was 0.15 mass %. Further, the storage elastic modulus G' of the fluorinated elastic copolymer was 152 kPa.

Example 8

[Step 1]
A stainless steel pressure resistant reactor equipped with an anchor blade and having an internal volume of 2,100 mL was deaerated, and 1,000 g of ultrapure water, sodium sulfite (119 mg), nBMA (297 mg) and iron(II) sulfate heptahydrate (15 mg) were charged. While the solution in the polymerization vessel was stirred, the temperature was increased to 70° C., and 5 mL of a 5 mass % ultrapure water solution of KPS was injected into the polymerization vessel to polymerize nBMA.

From the amount of nBMA charged, the amount of poly(nBMA) in 100 parts by mass of the aqueous medium is 0.030 parts by mass.
[Step 2]
30 Minutes later, 0.4 g of 8CNVE ($CF_2$=$CFOCF_2CF(CF_3)OCF_2CF_2CN$) and 10 g of ultrapure water were charged. Then, 63 g of PMVE and 13 g of TFE were charged (TFE:PMVE=24:74 molar ratio). The temperature was increased, and the internal pressure of the reactor when the internal temperature reached 80° C. was 0.93 MPaG. 40 mL of a 5 mass % ultrapure water solution of ammonium persulfate was added to initiate the polymerization. At a point when the internal pressure of the reactor reached 0.92 MPaG as the polymerization proceeded, TFE was injected to elevate the internal pressure of the reactor to 0.93 MPaG. This operation was repeated, and after every injection of 6 g of TFE, 7 g of PMVE and 0.4 g of 8CNVE were injected. At a point when the total mass of TFE added reached 80 g, addition of the later-added monomers was terminated, and the internal temperature of the reactor was decreased to 10° C. to terminate the polymerization reaction thereby to obtain a latex containing a fluorinated elastic copolymer. The polymerization time was 300 minutes. Further, the total masses of the later-added monomers added were 80 g of TFE, 50 g of PMVE and 4.3 g of 8CNVE, and the molar ratio calculated from the masses was TFE:PMVE: 8CNVE=72:27:1. The solid content concentration of the obtained copolymer aqueous dispersion was about 14%.

The latex was added to a 5 mass % aqueous solution of aluminum potassium sulfate to agglomerate and separate the fluorinated elastic copolymer. The fluorinated elastic copolymer was subjected to filtration, washed with deionized water and vacuum dried at 50° C. to obtain a white fluorinated elastic copolymer. The molar ratio of the respective monomers in the fluorinated elastic copolymer was TFE: PMVE:8CNVE=69.1:30.3:0.6. Further, the storage elastic modulus G' of the fluorinated elastic copolymer was 359 kPa.

Example 9

A 1.3 L stainless steel polymerization vessel was replaced with nitrogen, the pressure was decreased to −0.1 MPaG, and ultrapure water (640 g), t-butanol (11 g) and poly (MHFBE) (50 mg) (manufactured by Aldrich, tradename: Poly(2,2,3,3,4,4,4-heptafluorobutyl methacrylate)) were charged, and the temperature was increased to 60° C. while the solution in the polymerization vessel was stirred.

Then, HFP (16 g) was charged, and the pressure in the polymerization vessel was elevated to 1.6 MPaG with TFE monomer, and 20 ml of a solution (5 mass %) having APS dissolved in deionized water was injected into the polymerization vessel. Upon start of pressure drop in the polymerization vessel, TFE monomer was added so as to keep the internal pressure of the polymerization vessel to 1.6 MPaG thereby to make polymerization proceed. At a point when the amount of the TFE monomer continuously charged reached 83 g, the polymerization vessel was cooled to room temperature. The solid content concentration of the obtained fluorinated polymer aqueous dispersion was about 7%. The aqueous dispersion was cooled and the fluorinated polymer particles were agglomerated to collect a powder. The fluorinated polymer powder was dried at 150° C. The Q value of the obtained fluorinated polymer powder under a load of 7 kg was 23 mm$^3$/s. The molar ratio of TFE units/HFP units in the fluorinated polymer was 98.6/1.4.

Example 10

The system in a 1.2 L stainless steel polymerization vessel was replaced with nitrogen, the pressure was decreased to −0.1 MPaG, and ultrapure water (740 g), sodium sulfite (88 mg), poly(MHFBE) (30 mg) and t-butanol (11 g) were charged. While the solution in the polymerization vessel was stirred, the temperature was increased to 60° C., the pressure in the polymerization vessel was elevated to 2.6 MPaG with a monomer mixture TFE/E=86/14 (molar ratio), and 19.5 ml of a solution (5 mass %) having KPS dissolved in deionized water was injected into the polymerization vessel. Upon start of pressure drop in the polymerization vessel, a monomer mixture TFE/E=54/46 (molar ratio) was added so as to keep the internal pressure of the polymerization vessel to 2.6 MPaG to make polymerization proceed. At a point when the amount of the monomer mixture continuously charged reached 30 g, the polymerization vessel was cooled to room temperature. The polymerization time was 110 minutes. The solid content concentration of the obtained fluorinated polymer aqueous dispersion was about 4%. Further, D50 of the fluorinated polymer particles in the fluorinated polymer aqueous dispersion was 250 nm. The aqueous dispersion was cooled and the fluorinated polymer particles were agglomerated to collect a powder. The fluorinated polymer powder was dried at 150° C. The Q value of the obtained fluorinated polymer powder under a load of 30 kg was 5.5 mm$^3$/s, the molar ratio of TFE units/E units in the fluorinated polymer was 54.7/45.3. The melting point of the obtained fluorinated polymer was 272° C. With respect to the obtained fluorinated polymer, a peak derived from the specific polymer was detected at 1,760 cm$^1$ in an infrared absorption spectrum.

Example 11

The system in a 1.2 L stainless steel polymerization vessel was replaced with nitrogen, the pressure was decreased to −0.1 MPaG, and ultrapure water (740 g), sodium sulfite (88 mg) and MHFBE (624 mg) were charged. While the solution in the polymerization vessel was stirred, the temperature was increased to 60° C., 4 ml of a solution (5 mass %) having KPS dissolved in deionized water was injected into the polymerization vessel to polymerized MHFBE.

From the amount of MHFBE charged, the amount of poly(MHFBE) in 100 parts by mass of the aqueous medium is 0.084 parts by mass.

Then, the pressure in the polymerization vessel was elevated to 2.6 MPaG with a monomer mixture TFE/E=86/14 (molar ratio), and 12 ml of a solution (5 mass %) having KPS dissolved in deionized water, t-butanol (11 g) and MeOH (2.2 g) were charged into the polymerization vessel. Upon start of pressure drop in the polymerization vessel, a monomer mixture TFE/E=54/46 (molar ratio) was added so as to keep the internal pressure of the polymerization vessel to 2.6 MPaG to make polymerization proceed. At a point when the amount of the monomer mixture added reached 10 g, PFBE (0.7 g) was added. After every addition of 14 g of the monomer mixture, PFBE (0.7 g) was added. At a point when the amount of the monomer mixture continuously charged reached 80 g, the polymerization vessel was cooled to room temperature. The polymerization time was 458 minutes. The solid content concentration of the obtained fluorinated polymer aqueous dispersion was about 9%. Further, D50 of the fluorinated polymer particles in the aqueous dispersion was 262 nm.

The aqueous dispersion was cooled and the fluorinated polymer particles were agglomerated to collect a powder. The fluorinated polymer powder was dried at 150° C. The Q value of the obtained fluorinated polymer powder under a load of 7 kg was 5 mm$^3$/s, and the molar ratio of TFE units/E units/PFBE units in the fluorinated polymer was 53.8/45.3/0.96. The melting point of the obtained fluorinated polymer was 262° C. With respect to the obtained fluorinated polymer, a peak derived from the specific polymer was detected at 1,760 cm$^{-1}$ in an infrared absorption spectrum. The 1% thermogravimetric loss temperature by TG-DTA measurement was 429° C., and the 5% thermogravimetric loss temperature was 455° C.

Example 12

[Step 1]

The system in a 2.1 L stainless steel polymerization vessel was replaced with nitrogen, the pressure was decreased to −0.1 MPaG, and ultrapure water (1,274 g), sodium sulfite (152 mg), nBMA (568 mg), iron(II) sulfate heptahydrate (19 mg) and CHELEST HC (29 mg) were charged. While the solution in the polymerization vessel was stirred, the temperature was increased to 60° C., and 6.5 ml of a solution (5 mass %) having KPS dissolved in deionized water was injected into the polymerization vessel to polymerize nBMA. From the amount of nBMA charged, the amount of poly(nMBA) in 100 parts by mass of the aqueous medium is 0.044 parts by mass.

[Step 2]

Then, the pressure in the polymerization vessel was elevated to 2.5 MPaG with vinylidene fluoride (hereinafter sometimes referred to as "VDF"), and 19.5 ml of a solution (5 mass %) having KPS dissolved in deionized water was injected into the polymerization vessel. Upon start of pressure drop in the polymerization vessel, VDF was added so as to keep the internal pressure of the polymerization vessel to 2.5 MPaG thereby to make polymerization proceed. At a point when the amount of VDF continuously charged reached 30 g, the polymerization vessel was cooled to room temperature, and the gas in the polymerization vessel was discharged to the air. The polymerization time was 120 minutes. The solid content concentration of the obtained fluorinated polymer aqueous dispersion was about 4%.

The aqueous dispersion was cooled and the fluorinated polymer particles were agglomerated to collect a powder. The fluorinated polymer powder was dried at 150° C. The Q value of the obtained fluorinated polymer powder under a load of 30 kg was 1 mm$^3$/s, and the melting point of the obtained fluorinated polymer was 172° C. With respect to the obtained fluorinated polymer, a peak derived from the specific polymer was detected at 1,740 cm$^{-1}$ in an infrared absorption spectrum.

The details of the production method in Examples are summarized in Table 1, and the details of the fluorinated polymer aqueous dispersions are summarized in Table 2.

In Table 1, "polymerization initiator amount" means the amount (molar amount) of the water-soluble polymerization initiator used per 1 mol of the compound (1) in step 1, and "specific polymer amount" means the content (parts by mass) of the specific polymer in 100 parts by mass of the aqueous medium used in step 2.

Further, in Table 2, "fluorinated polymer amount" means the content (parts by mass) of the fluorinated polymer per 100 parts by mass of water in the obtained aqueous dispersion, "specific polymer amount A" means the content (parts by mass) of the specific polymer per 100 parts by mass of water in the obtained aqueous dispersion, and "specific polymer amount B" means the content (parts by mass) of the specific polymer per 100 parts by mass of the fluorinated polymer in the obtained aqueous dispersion.

TABLE 1

| Example | 1 | 2 | 3 | 4 | 5 | 6 | 7 | 8 | 9 | 10 | 11 | 12 |
|---|---|---|---|---|---|---|---|---|---|---|---|---|
| Fluorinated polymer | ETFE | ETFE | ETFE | ETFE | PFA | PF2 | PF2 | PF2 | FEP | ETFE | ETFE | PVdF |
| Polymerization initiator amount | 0.6 | 0.6 | 0.6 | 0.3 | 0.6 | 0.9 | 0.5 | 0.9 | — | — | 1.3 | 0.6 |
| Specific polymer amount | 0.044 | 0.084 | 0.044 | 0.084 | 0.044 | 0.030 | 0.057 | 0.030 | 0.008 | 0.004 | 0.084 | 0.045 |

TABLE 2

| Example | 1 | 2 | 3 | 4 | 5 | 6 | 7 | 8 | 9 | 10 | 11 | 12 |
|---|---|---|---|---|---|---|---|---|---|---|---|---|
| Fluorinated polymer | ETFE | ETFE | ETFE | ETFE | PFA | PF2 | PF2 | PF2 | FEP | ETFE | ETFE | PVdF |
| Fluorinated polymer amount | 9 | 8 | 4 | 4 | 4 | 13 | — | 14 | 7 | 4 | 9 | 4 |
| Specific polymer amount A | 0.044 | 0.084 | 0.044 | 0.084 | 0.044 | 0.030 | 0.057 | 0.030 | 0.008 | 0.004 | 0.084 | 0.045 |
| Specific polymer amount B | 0.495 | 1.054 | 1.115 | 2.108 | 1.115 | 0.228 | — | 0.212 | 0.112 | 0.101 | 0.937 | 1.115 |

This application is a continuation of PCT Application No. PCT/JP2020/013770, filed on Mar. 26, 2020, which is based upon and claims the benefit of priority from Japanese Patent Application No. 2019-060003 filed on Mar. 27, 2019. The contents of those applications are incorporated herein by reference in their entireties.

What is claimed is:

1. A method for producing a tetrafluoroethylene polymer, comprising:
   polymerizing at least one fluorinated monomer selected from the group consisting of tetrafluoroethylene, chlorotrifluoroethylene, and vinylidene fluoride, in an aqueous medium in which no emulsifier is contained, and in the presence of a first polymer having units based on a compound of formula (1), $CXY=CR^1-L-R^2$,
   where X and Y are each independently a hydrogen atom, a halogen atom or a methyl group,
   $R^1$ is a hydrogen atom, a halogen atom or a $C_{1-3}$ alkyl group,
   L is —CO—O—*, —O—CO—* or —O—, provided that * represents the binding position to $R^2$, and
   $R^2$ is a cyclic alkyl group, a monovalent aromatic hydrocarbon group or a $C_{1-6}$ linear alkyl group, provided that the $C_{1-6}$ linear alkyl group as $R^2$ may have an etheric oxygen atom in a carbon-carbon bond,
   wherein the first polymer comprises particles having a volume based cumulative 50% particle size of from 10 to 200 nm,
   wherein the tetrafluoroethylene polymer is a tetrafluoroethylene copolymer selected from the group consisting of
   a tetrafluoroethylene/ethylene (TFE/E) copolymer having a proportion of E units to a total amount of E and TFE units in a range of 20 to 70 mol %,
   a tetrafluoroethylene/perfluoro (alkyl vinyl ether) (TFE/PAVE) copolymer having a proportion of PAVE units of at least 0.1 and less than 20 mol % or the proportion of PAVE units in a range of 20 to 70 mol % with respect to a total amount of TFE and PAVE units, and
   a tetrafluoroethylene/hexafluoropropylene (TFE/HFP) copolymer having a proportion of HFP units in a range of 1 to 15 mol % with respect to a total amount of TFE and HFP units.

2. The method according to claim 1, wherein the amount of the first polymer present is from 0.0001 to 1.0 parts by mass per 100 parts by mass of the aqueous medium.

3. The method according to claim 1, wherein the first polymer comprises particles having a volume based cumulative 50% particle size of from 10 to 150 nm.

4. The method according to claim 1, wherein the aqueous medium further comprises a water-soluble polymerization initiator in an amount of from 0.1 to 5.0 mol per mol of the compound represented by the formula (1).

5. A method for producing a tetrafluoroethylene polymer, comprising:
   polymerizing a compound of formula (1) in an aqueous medium to obtain an aqueous medium in which a first polymer is present; and
   polymerizing at least one fluorinated monomer selected from selected from the group consisting of tetrafluoroethylene, chlorotrifluoroethylene, and vinylidene fluoride in the aqueous medium in which no emulsifier is contained and the first polymer is present to produce the tetrafluoroethylene polymer,
   wherein the formula (1) is $CXY=CR^1-L-R^2$,
   where X and Y are each independently a hydrogen atom, a halogen atom or a methyl group,
   $R^1$ is a hydrogen atom, a halogen atom or a $C_{1-3}$ alkyl group,
   L is —CO—O—*, —O—CO—* or —O—, provided that * represents the binding position to $R^2$, and
   $R^2$ is a cyclic alkyl group, a monovalent aromatic hydrocarbon group or a $C_{1-6}$ linear alkyl group, provided that the $C_{1-6}$ linear alkyl group as $R^2$ may have an etheric oxygen atom in a carbon-carbon bond,
   wherein the first polymer comprises particles having a volume based cumulative 50% particle size of from 10 to 200 nm, and
   wherein the tetrafluoroethylene polymer is a tetrafluoroethylene copolymer selected from the group consisting of
   a tetrafluoroethylene/ethylene (TFE/E) copolymer having a proportion of E units to a total amount of E and TFE units in a range of 20 to 70 mol %,
   a tetrafluoroethylene/perfluoro(alkyl vinyl ether) (TFE/PAVE) copolymer having a proportion of PAVE units of at least 0.1 and less than 20 mol % or the proportion of PAVE units in a range of 20 to 70 mol % with respect to a total amount of TFE and PAVE units, and
   a tetrafluoroethylene/hexafluoropropylene (TFE/HFP) copolymer having a proportion of HFP units in a range of 1 to 15 mol % with respect to a total amount of TFE and HFP units.

6. The method according to claim 5, wherein the aqueous medium in which the first polymer is present is an aqueous medium suitable to produce the first polymer.

7. The method according to claim 5, wherein the compound represented by formula (1) is polymerized by using a water-soluble polymerization initiator is in an amount in a range of 0.1 to 5.0 mol per mol of the compound of the formula (1).

8. The method according to claim 5, wherein an amount of the first polymer present during the polymerizing is in a range of 0.0001 to 1.0 parts by mass per 100 parts by mass of the aqueous medium.

9. The method according to claim 5, wherein the first polymer comprises particles having a volume based cumulative 50% particle size of from 10 to 150 nm.

* * * * *